No. 692,209. Patented Jan. 28, 1902.
F. W. OSTROM.
BUTTONHOLE SEWING AND CUTTING MACHINE.
(Application filed Feb. 21, 1900.)
(No Model.) 6 Sheets—Sheet 1.

Fig. 1.

WITNESSES:
J. H. Finch.
Jane S. Fair.

INVENTOR
Freeland W. Ostrom.
BY
W. H. Fuennel
ATTORNEY

THE NORRIS PETERS CO., PHOTO-LITHO., WASHINGTON, D. C.

No. 692,209. Patented Jan. 28, 1902.
F. W. OSTROM.
BUTTONHOLE SEWING AND CUTTING MACHINE.
(Application filed Feb. 21, 1900.)

(No Model.) 6 Sheets—Sheet 2.

Fig. 2.

WITNESSES: INVENTOR
Freeland W. Ostrom
BY
ATTORNEY

No. 692,209. Patented Jan. 28, 1902.
F. W. OSTROM.
BUTTONHOLE SEWING AND CUTTING MACHINE.
(Application filed Feb. 21, 1900.)
(No Model.) 6 Sheets—Sheet 3.

WITNESSES:
INVENTOR
ATTORNEY

No. 692,209. Patented Jan. 28, 1902.
F. W. OSTROM.
BUTTONHOLE SEWING AND CUTTING MACHINE.
(Application filed Feb. 21, 1900.)
(No Model.) 6 Sheets—Sheet 5.

WITNESSES:

INVENTOR
Freeland W. Ostrom
BY
ATTORNEY

No. 692,209. Patented Jan. 28, 1902.
F. W. OSTROM.
BUTTONHOLE SEWING AND CUTTING MACHINE.
(Application filed Feb. 21, 1900.)
(No Model.) 6 Sheets—Sheet 6.

WITNESSES:

INVENTOR
Freeland W. Ostrom
BY
ATTORNEY

UNITED STATES PATENT OFFICE.

FREELAND W. OSTROM, OF BRIDGEPORT, CONNECTICUT, ASSIGNOR TO WHEELER & WILSON MANUFACTURING COMPANY, OF BRIDGEPORT, CONNECTICUT, A CORPORATION OF CONNECTICUT.

BUTTONHOLE SEWING AND CUTTING MACHINE.

SPECIFICATION forming part of Letters Patent No. 692,209, dated January 28, 1902.

Application filed February 21, 1900. Serial No. 6,107. (No model.)

*To all whom it may concern:*

Be it known that I, FREELAND W. OSTROM, a citizen of the United States, residing at Bridgeport, in the county of Fairfield and State of Connecticut, have invented a certain new and useful Improvement in Buttonhole-Sewing Machines, of which the following is a full, clear, and exact description.

This invention relates to improvements in buttonhole-sewing machines; and it is adapted for automatically overseaming, or for automatically overseaming and then cutting, or for automatically cutting and then overseaming buttonholes having like or unlike barred ends, and, broadly considered, embraces the barring of the buttonhole by stitches placed substantially parallel to the side stitches.

The mechanism devised and as herein substantially described consists, primarily, of a controller-cam and two or more jog-rollers, the relative action of which permits the cam to control at all times the position of the material transverse to the length of the buttonhole and the feed of the material transverse to its lengthwise feed movements, the extent of such transverse feed movements being capable of adjustment, and such adjustment is so devised and combined as to not interfere with the continued control of the material by the action of the cam.

Through the relative action of the cam and jog-rollers above referred to a true former is maintained for controlling the position of the material transverse to the length of the buttonhole and the feed of the material transverse to its lengthwise feed movements, effecting a uniformity of production under all conditions of adjustment necessary for varying the distance between the edge and the depth stitches which comprise the two sides of overseaming.

While this invention, as before stated, consists, primarily, in the peculiar cam and its coacting jog-rollers or followers for the purpose stated, another and important feature of the invention is its adaptability to effect the automatic cutting of the buttonhole-slit before or after the overseaming of the opposite sides of the buttonhole and, as herein shown and described, by a single adjustment of a single element of construction.

Important to buttonhole-overseaming, wherein the buttonhole-slit is cut substantially at the commencement of the overseaming, is the positioning of what is termed the "purl" of the stitch relatively to the buttonhole-slit. The purl consists of the loop occasioned by the interlocking of the bobbin and the needle threads. If the needle-thread is given sufficient tension to draw from the bobbin-thread enough to form an entire overseam-stitch, the upper or needle thread acts simply as a cord to lock together the successive overseam-stitches, making the line of the needle-thread the purl-line, which should lie along the upper inner cut edge of the material. In prior constructions it has been impossible to practically control the relative position of the buttonhole-slit and line of purl, owing to the uncertain position of the stitches made just following the side last overseamed and the stitches made just prior to the commencement of the side next to be overseamed. The construction herein shown and described embodies means for insuring that the purl of the stitches shall be uniformly positioned relatively to the buttonhole-slit and on the inner upper cut edges of the material.

In the accompanying drawings, illustrating my invention, in the several figures of which like parts are similarly designated, Fig. 9ᵃ is an under side view of portion of the cam shown in Fig. 9. Fig. 10ᵃ is a diagrammatic view in which the arrows indicate the direction in which the overseaming and barring of the buttonhole progresses, the feed of the material being in the opposite direction.

In carrying out my invention the stitch-forming mechanism, the mechanism for automatically cutting the buttonhole-slit during the needle actuation, and the stop-motion mechanism for arresting the cloth-clamp-actuating and stitch-forming mechanism at the completion of the overseaming of the buttonhole may be and are here shown as of well-known construction, with the exception that the stop-mechanism trip-pin $p$, carried by the feed-cam, is capable of adjustment, and this feature of the construction is an important element of the invention, as will hereinafter be fully and specifically pointed out.

For a clear understanding of the parts comprising the stitch-forming mechanism, which are well understood and not new to my present invention, I have designated such parts by the letter $q$. The elements for automatically actuating the cutter are in construction and operation substantially the same as the like parts illustrated and described in my United States Patent No. 439,680, dated November 4, 1890, and such parts I have designated by the letter Z. The elements comprising the stop-mechanism parts are in construction and operation, with the exception of the tripping-pin, previously referred to, substantially the same as the like parts illustrated and described in my United States Patent No. 622,632, dated April 4, 1899, and such parts I have designated by the letter S.

Figure 1:
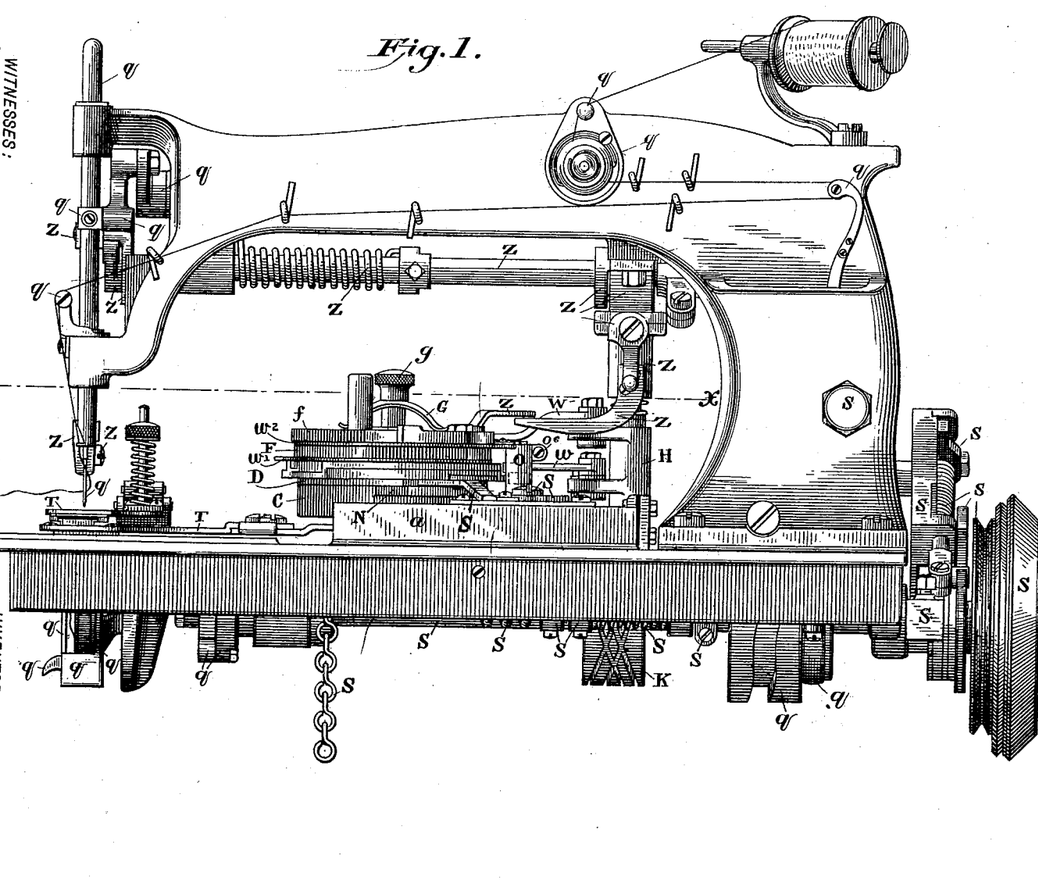
Figure 1 is a front side elevation of a buttonhole-stitching machine embodying my invention.
Figure 2:
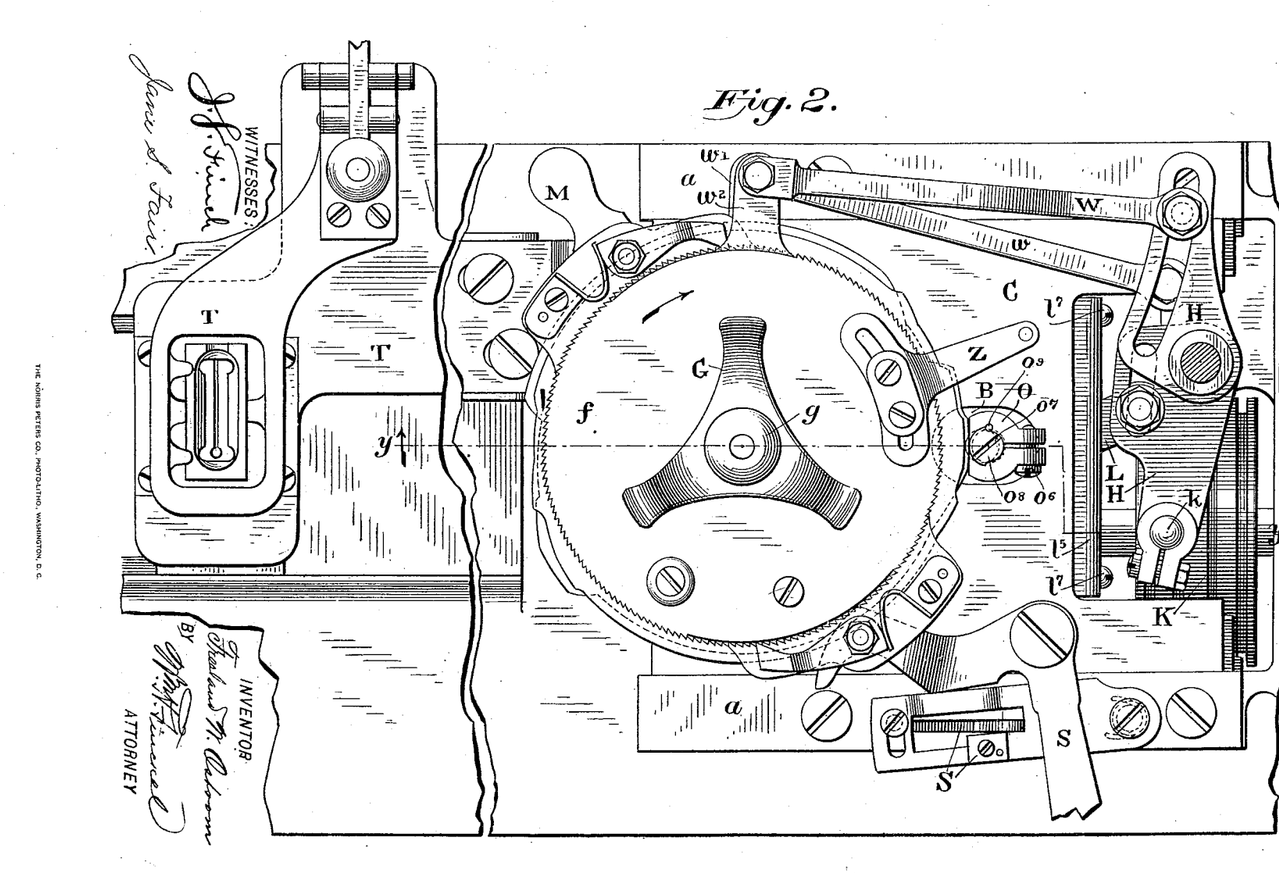
Fig. 2 is a plan view on line $x\,x$, Fig. 1.
Figure 3:
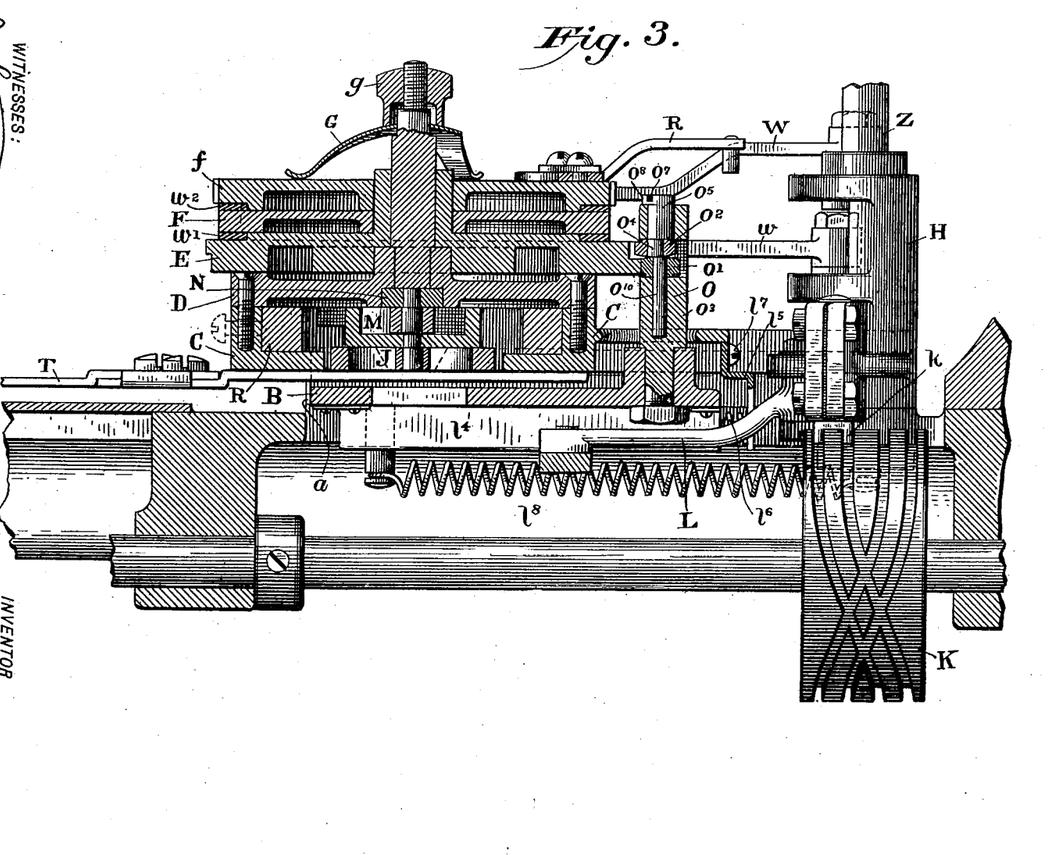
Fig. 3 is a longitudinal sectional view in line $y\,y$, Fig. 2.

Referring to Figs. 1, 2, and 3, two ratchet-wheels F and $f$, operatively connected, through the connections W and $w$ and tie-rings $w'$ and $w^2$, to the vibrating lever H, are employed to control the feed movements of the material, the upper ratchet-wheel $f$ to control the number of stitches comprising the two sides of overseaming, the lower ratchet-wheel F the number of barring-stiches, and while this manner of feed is an element of construction in connection with the present invention functionally it has no connection, except to give feed movements to the material, and might, for all purposes of this invention, consist of any other well-understood feed construction; but to facilitate an understanding of the operation I will explain that the two ratchet-wheels form only a single circle of ratchet-teeth, the upper ratchet-wheel being supplied with ratchet-teeth corresponding to the movements of the cloth-holding clamp for the overseaming of the two sides of the buttonhole, the remainder of its periphery comprising a smooth surface, and the lower ratchet-wheel is supplied with ratchet-teeth corresponding with the movements of the cloth-holding clamp during the barring of the opposite ends of the buttonhole, the remainder of its periphery comprising a smooth surface. Each ratchet-wheel coacts with independently-mounted pawls and each is provided with an independent connection for connecting the actuation of the pawls with that of the vibrating lever, such connections having independent adjustments, so it results that the number of stitches employed in barring the opposite ends of the buttonhole is not dependent upon the adjustment of the connection controlling the feed of the material for the overseaming of the opposite sides of the buttonhole, and consequently the number of stitches employed for the overseaming of the two sides is not dependent upon the adjustment of the connection for controlling the placing of the barring-stitches. A different combination effecting a like result is illustrated in Patent No. 626,189, dated May 30, 1899, Fig. 14, and particularly referred to in the specification, commencing on line 119, page 3, and ending with line 20, page 5.

Figure 4:
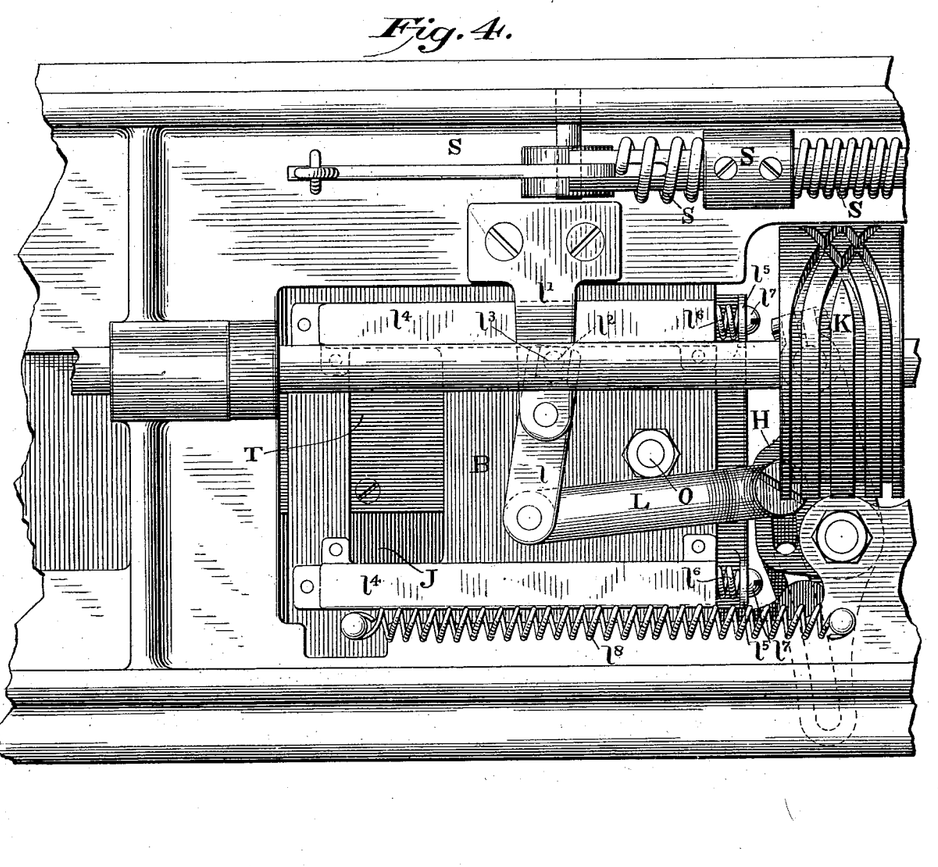
Fig. 4 is an under side view illustrating the mechanism for giving to the material its vibratory movements for the placing of the edge and the depth stitches.

Referring to Figs. 2, 3, and 4, the under slide-frame B, the upper slide-frame C, the lower cross-slide J, to which the cloth-clamp is attached, the adjustable cross-slide M, the upper cross-slide N, the cam-plate D, the circular plate R, the friction-spring G, the friction-spring nut $g$, the switch-cam K, with the exception that it is provided with a double groove, the switch-cam follower $k$, with the exception that it is provided with a double shoe, the guideways $a\ a$, and the connection L are in construction and operation similar to correspondingly-designated parts in United States Patent to A. C. Campbell, No. 303,557, dated August 12, 1884, and enter into the present construction as one form of well-understood mechanism for controlling the movements of the cloth-holding clamp T, the latter of well-known construction and commonly employed in connection with the Wheeler & Wilson automatic buttonhole-sewing machine.

Referring to Fig. 4, the connection L, instead of being directly connected to the lower slide-frame, as in the construction illustrated and described in said Patent No. 303,557, is connected to a lever $l$, which in turn is pivotally attached to a bracket $l'$, secured to the bed of the machine, the lever $l$ coacting with the slide-block $l^2$, (shown in dotted lines,) mounted on a pin $l^3$, secured in the slide-frame B, for giving vibratory movements through the switch-cam K to the slide-frame B and parts carried thereby. The means recited give vibratory movements to the slide-frame B and effect the step-by-step rotatory feed movements of the ratchet-wheels and feed-cam when the cloth-clamp is moved in a direction opposite to that employed in the Patent No. 303,557 for effecting a like feed movement; but the result could be obtained by directly connecting the connection L to the lower slide-frame B and through the action of the feed mechanism reverse the step-by-step rotatory feed movements of the ratchet-wheels and feed-cam.

To avoid any misunderstanding of the foregoing, I will explain in detail the object of the change in the vibration of the cloth-clamp relatively to the step-by-step rotatory movements of the ratchet-wheels and feed-cam. The time of the action of the cutter depends upon the step-by-step rotatory movements of the ratchet-wheels and not upon the vibratory movements of the clamp-actuating mechanism. Consequently the cutter is caused to descend in line with the lock-stitch made next subsequent to a feed movement, such stitch being the edge stitch in overseaming one side of the buttonhole and the depth-stitch when overseaming the opposite side, making it necessary to effect the edge stitch next subsequent to the feed movement which brings into action the cutter, and such control of the cutter depends upon whether the cutter is caused to descend when placing stitches to the right or to the left of the buttonhole-slit during the operation of barring. In the present instance the cutter is brought into action when placing barring-stitches at the right of the buttonhole-slit, while in the Patent No. 439,680 the cutter is brought into action just after placing side overseam-stitches located at the left of the buttonhole-slit. Consequently the change in the hitch up between the slide-frame B and switch-cam K embraces a specific construction which might be changed in detail, and such change in detail of construction might not be demanded if my invention were applied to some differently-constructed cutter-actuating and clamp-actuating mechanisms, and such change in construction would in no way affect the scope or application of my invention.

Referring to Figs. 2, 3, and 4, to the under side of the slide-frame B are secured two spring-pockets $l^4 l^4$, inclosing springs $l^6 l^6$, which bear against a spring-step $l^5$, secured to the upper slide-frame C by screws $l^7 l^7$. Referring to Fig. 4 of reference Patent No. 303,557, the springs B' B' for effecting the like function of forcing the feed-cam into operative relation with the jog-roller $o$, secured in the jog-roller stud O, so designated in said patent, for the purpose of controlling the two sides of overseaming relatively to the buttonhole-slit are located between the two slide-frames. The purpose of the change, as illustrated and described herein, is to secure a greater resiliency by the employment of longer springs.

Located at one side of the under slide-frame is a spring $l^8$, one end of which is secured to the under side of the lower slide-frame B, its opposite end being secured to the under side of the machine-frame. The employment of this spring $l^8$ is to avoid as much as possible lost motion incident to long use.

A cam E is employed which, as will presently appear, is a controller, former, or pattern cam. This cam has on its under side a feed-cam groove $e$, Fig. 5, for giving feed movements to the material lengthwise of the buttonhole. The periphery of the cam is stepped vertically—that is to say, it is provided with a series of concentric and eccentric portions vertically separated for controlling the movements of the material transverse to its lengthwise feed movements.

O is a jog-roller stud provided with two jog-rollers $o' o^2$, the jog-roller $o'$ mounted upon a pin $o^{10}$, secured in the lower portion $o^3$ of the stud O, while the upper jog-roller $o^2$ is fulcrumed on an eccentric-pin $o^4$, secured to or made a part of the adjusting-bolt $o^5$, the latter being retained in its adjusted position in the jog-roller stud by the pinch-screw $o^6$, permitting the jog-roller $o^2$ to be adjusted relatively to the jog-roller $o'$. For convenience of adjustment the adjusting-bolt $o^5$ is provided with a screw-slot $o^7$ and a flange $o^8$, the latter, in connection with the pin $o^9$, secured in the jog-roller stud O, limiting the movement of the eccentric-pin to substantially a half-revolution.

Figures 5, 6, 7, 8, 9, 9A:
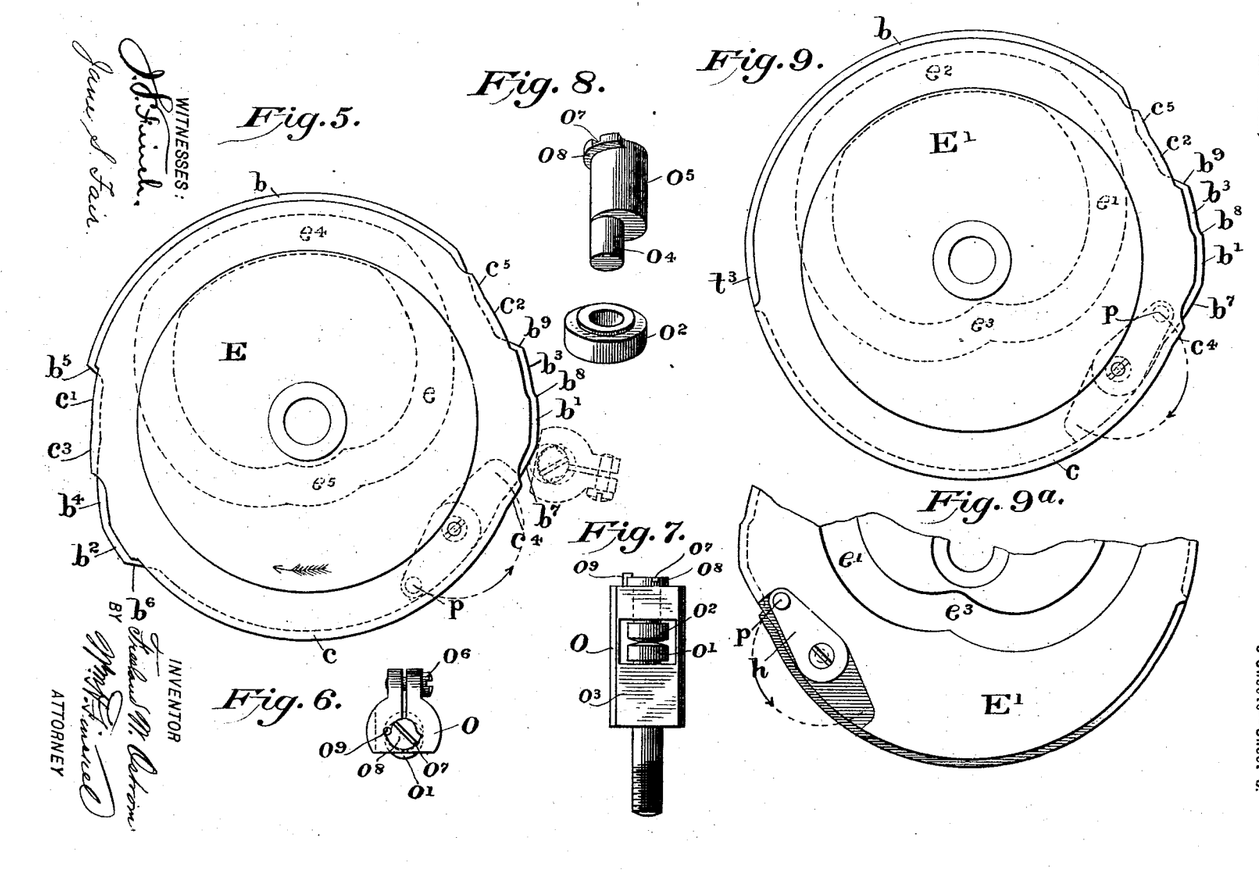
Fig. 5 is a plan view of the controller-cam for effecting the barring of a buttonhole, as illustrated by Fig. 10.
Fig. 6 is a plan view of the jog-roller stud.
Fig. 7 is a view in elevation of the jog-roller stud and attached jog-rollers.
Fig. 8 is a detail perspective view of the adjustable jog-roller and its eccentric-stud.
Fig. 9 is a plan view of the controller-cam for effecting the barring of a buttonhole, as illustrated by Fig. 11.

Referring to Fig. 5, the cam E is provided at its periphery with two oppositely-arranged concentric portions $b$ and $c$ of unequal radii and on opposite sides of a median plane at right angles to the axis of revolution. The difference in the radii of these two portions when employed in connection with the jog-rollers or followers $o'$ and $o^2$ (see Fig. 7) is sufficient to provide for properly presenting the opposite sides of the buttonhole-slit for the action of the needle when employing the longest overseam-stitch (the distance from edge to depth stitch) that may be required, and such difference in radii may, in effect, be varied by the adjustment of the jog-roller $o^2$, mounted on the eccentric $o^4$ of the adjusting-bolt $o^5$, as will be later more fully explained. The portion $b$ and jog-roller $o'$ control the overseaming of the side $d'$, (see Figs. 10 and 11,) and the portion $c$ and jog-roller $o^2$ control the overseaming of the side $g'$.

From the foregoing it will be understood that the line of side overseaming $d'$, controlled by the portion $b$ and jog-roller $o'$, is a fixed line of overseaming not subject to adjustment except in the matter of change in the length of overseam-stitch through the adjustment of the connection L in the vibrating lever H. If for any purpose the length of the overseam-stitch be lengthened or shortened, the line of side overseaming $g'$ must be adjusted toward or away from the side overseam $d'$, dependent upon the nature of the adjustment, or the two lines of edge stitches would be interlocked or too widely separated. Thus it will be understood that an adjustment of the jog-roller $o^2$ toward or away from the periphery $b$ of the cam E, as the circumstances might demand, (see Fig. 3,) will properly position the material through the connections connecting the cam E with the cloth-clamp, so that the needle will penetrate the material in the overseaming of the side $g'$ in proper relation with the overseaming of the side $d'$.

Figure 10:
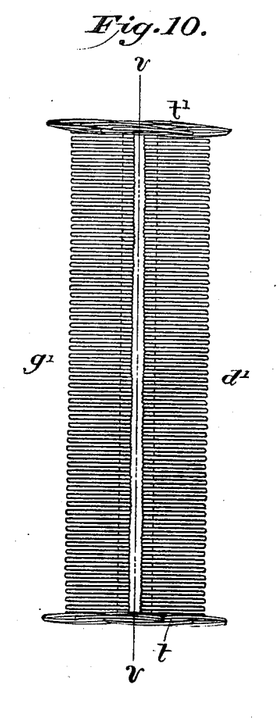
Fig. 10 is an enlarged view illustrating one form of barring of the opposite ends of a buttonhole.
Figure 10A:
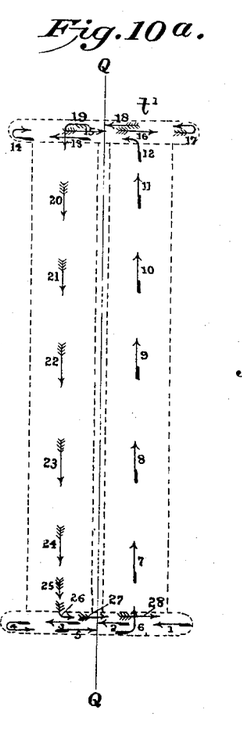

Referring to Fig. 10, drawn centrally and lengthwise of the view is a line $v\ v$ and through the diagrammatic view, Fig. 10ª, a like line Q Q. Referring to these views in connection with Fig. 5, supposing the buttonhole-slit be cut during the barring and before the commencement of the overseaming, the relative position of jog-rollers and controller-cam E would be substantially as is represented in Fig. 5, and the first stitches placed would be in the extreme right of the bar $t$, caused by the roller $o'$ riding the concentric portion $b'$. The jog-roller $o'$, through the step-by-step rotatory movements of the cam E, is next caused to ride the eccentric portion $b^8$, and having passed the portion $b^8$ rides the concentric portion $b^3$, the radius of which is substantially that of portion $b$, permitting stitches to be placed in the bar $t$ in alinement with the side overseam-stitches $d'$, and as a result the cutter will be actuated during the barring operation instead of at substantially the commencement of the overseaming of the first side, as has been the practice when the buttonhole-slit is cut prior to the overseaming. Following this the jog-roller $o'$ is caused to ride the eccentric portion $b^9$. This movement is then followed by the engagement of jog-roller $o^2$ on the concentric portion $c^2$, which latter portion positions the material for the placing of the stitches in the extreme left of the bar $t$. The transition of control from the concentric portion $b^3$ to the portion $c^2$ of the cam E also effects a transition of control from the jog-roller $o'$ and a portion of the cam below the median plane to that of the jog-roller $o^2$ and a portion above the median plane, and such transition in control and in coaction of parts occurs when the feed transverse to the lengthwise feed carries the material under the needle from the left to the right of the line V V in Fig. 10.

From the foregoing it will be understood that when placing stitches to the right of the line V V the jog-roller $o'$ and some portion of the cam E below the median plane will be in operative relation and when stitching at the left of such line the jog-roller $o^2$ and some portion of the cam above the median plane will be in operative relation, it being further understood that the vibration of the material effects an interlocking of the bar-stitches made substantially at the time of transition of control of jog-rollers and cam portion. As the jog-roller $o^2$ completes its travel of the concentric portion $c^5$ (the jog-roller $o'$ mounts the portion $b$ for the overseaming of the right-hand side $d'$) the material is fed from right to left under the needle and across the line V V, thus transferring the control of the transverse feed from the jog-roller $o^2$ and a portion of the cam above the median plane to the jog-roller $o'$ and a portion of the cam below the median plane, completing that portion of the bar $t$ started prior to the overseaming of the two sides and the barring of the opposite end, and the progression of such barring-stitches is designated by the arrows 1 to 6, inclusive. (See Fig. 10ª.)

I will here state that in the present construction the cam-groove $e$ is designed to suspend the feed of the material lengthwise of the buttonhole during the barring operation, as indicated at $e^5$, Fig. 5; but such manner of feed control is a matter of choice and could be changed to give more or less feed movement to the material while placing the barring-stitches without in any manner affecting my present invention.

To continue the cycle of control of the cam and jog rollers, the riding of the concentric portion $b$ by the jog-roller $o'$ positions the material for the overseaming of the side $d'$ of the buttonhole-slit, and the progression of the overseaming is designated by the arrows 7 to 11, inclusive, and a portion of the arrow 12. At the completion of the overseaming of the first side of the buttonhole—that is, side $d'$—the material is given a transverse feed from left to right by the jog-roller $o'$ riding a portion of the eccentric portion $b^5$, and coincident with the left-to-right transverse feed is a transition of control from the jog-roller $o'$ and eccentric portion $b^5$ below the median plane to jog-roller $o^2$ and concentric portion $c'$ above the median plane, and the progression of the bar-stitches placed during the coaction of eccentric portion $b^5$ and jog-roller $o'$ and concentric portion $c'$ and jog-roller $o^2$ is designated by the arrow 13 and a portion of arrows 12 and 14. The continued control of the jog-roller $o^2$ and concentric portion $c'$ positions the material for the placing of the bar-stitches in the extreme left of the bar $t'$, followed by a transverse feed from right to left, controlled by the jog-roller $o^2$ riding the eccentric portion $c^3$ until the transverse feed has progressed one-half its length, when there is a transition of control to the jog-roller $o'$ and eccentric portion $b^4$ below the median plane, and such control is continued until the jog-roller $o'$ mounts the concentric portion $b^2$, and the progression of such bar-stitches is designated by the arrows 15 and 16 and a portion of arrows 14 and 17. The riding of the concentric portion $b^2$ by the jog-roller $o'$ positions the material for the placing of the bar-stitches in the extreme right of the bar $t'$ and is followed by a transition of control from the jog-roller $o'$ and concentric portion $b^2$ to the jog-roller $o^2$ and concentric portion $c$ as the eccentric portion $b^6$ passes the jog-rollers in its control of the transverse feed of the material from left to right, and such bar-stitches are designated by the arrow 18 and portions of arrows 17 and 19. The continued control of the material by the coaction of the jog-roller $o^2$ and concentric portion $c$ positions the material for the overseaming of the last side of the buttonhole—that is, the side $g'$—and the progression of the overseaming is designated by the arrows 20 to 25, inclusive, and a portion of arrows 19 and 26. The last side being completed the jog-roller $o^3$ rides the inclines $c^4$, followed by the jog-roller $o'$ riding the incline $b^7$ in its travel to mount the concentric portion $b'$, and, as in all prior instances herein mentioned, when the stitching progresses across the line V V there is a transition of control, and the progression of these last-mentioned stitches is designated by the arrows 27 and 28 and a portion of arrow 26, completing the cycle of control necessary for the overseaming and barring of a buttonhole, as illustrated by Fig. 10.

Figure 11:
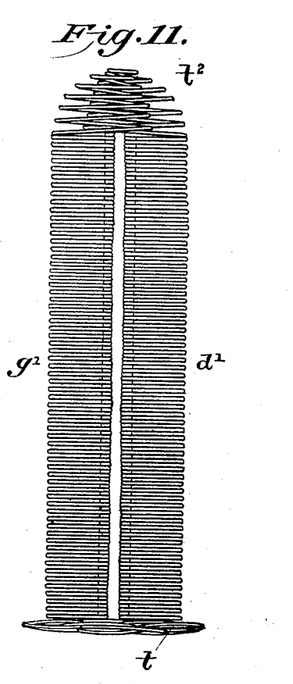
Fig. 11 is a second form of barring the opposite ends of a buttonhole.

Fig. 9 illustrates a form of controller-cam which if substituted for the cam E would produce the form of buttonhole represented by Fig. 11. The necessary changes in construction as differentiated from the construction illustrated in Fig. 5 are, first, a construction of feed-cam groove so as to effect a continuous feed of the material while barring the end $t^2$ of the buttonhole, Fig. 11, and such change is readily understood by a comparison of the cam-groove $e$ in the cam E with the cam-groove $e'$ in the cam E'. The cam-groove $e$ is constructed with concentric portions $e^4$ and $e^5$, while the cam-groove $e'$ effects a continuous feed of the material while the cam-roller is passing the heel $e^3$ of the cam-groove. Second, the employment of a gradual incline $t^3$ instead of the concentric and eccentric portions $b^6$, $b^2$, $b^4$, $c^3$, $c'$, and $b^5$ of Fig. 5, this gradual incline $t^3$ serving to effect a transition of control of cam portion and jog-roller when the transverse feed carries the material across the line of the buttonhole-slit. The peripheral portion opposite to that of the incline $t^3$ is the same as the peripheral portions $c^4$, $b^7$, $b'$, $b^8$, $b^3$, $b^9$, $c^2$, and $c^5$ of the cam illustrated by Fig. 5 and is so designated. The concentric portions $e^2$ and $e^4$ are of like construction and operation.

Referring to Fig. 5, between the eccentric portions $b^8$ and $b^9$ there is formed a concentric portion $b^3$, the purpose of which is to provide means whereby the material will be positioned relatively to the actuation of the cutter so that the buttonhole-slit may be cut either before the commencement of the overseaming of the first side or after the completion of the overseaming of the second or last side. Referring to Figs. 5, 9, and 9ª, to the under side of the controller-cam is adjustably secured a plate $h$, provided with a trip-pin $p$, which coöperates with the trip-lever of the stop mechanism. When this trip-pin is adjusted as illustrated by dotted lines, Fig. 5, it is capable of operating the stop mechanism with the jog-rollers in substantially the position represented in Fig. 2, which is prior to the actuation of the cutter, and thereby is caused the actuation of the cutter during the placing of bar-stitches in the buttonhole next to be stitched, or the pin $p$ may be adjusted to the position illustrated by dotted lines, Fig. 9, with the jog-roller at $c^2$, which would result in an actuation of the cutter after the completion of the overseaming of the second or last side. Thus it will appear that it is possible to control the action of the stop mechanism to arrest the action of the machine just prior to or directly after the cutter actuation, dependent upon the adjusted position of the trip-pin.

Referring to Figs. 5, 9, and 9ª, it will be understood that the pin $p$ is made capable of adjustment in one or the other of the two positions illustrated by swinging the plate $h$, as indicated by the arrow, said plate being suitably frictioned to hold the trip-pin in either of its adjusted positions.

From the foregoing it will be understood that by providing means for actuating the cutter during the barring operation the change in cutting from before to after the overseaming of the two sides can be accomplished by simple adjustments instead of being obliged to reverse the vibration of the material relatively to a feed movement, as has been previously pointed out as being necessary when the automatic actuation of the cutter is timed to occur substantially coincident with the commencement or completion of the side overseaming, dependent upon whether it is desired to operate the cutter before or after the overseaming.

While the cam mechanism for controlling the various feed movements is illustrated and described as consisting of a single element of construction, it will be understood that such controlling elements might consist of one or more elements without affecting the scope or application of my invention.

The number of stitches entering into the formation of the bars may be varied at pleasure within the adjustments of which the machine is capable, and for purposes of illustration only I have shown these bars as composed of a considerable number of overlaid stitches. I do not, however, limit my invention to the number of stitches employed.

What I claim is—

1. In a buttonhole-sewing machine, stitch-forming mechanism, a cloth-holding clamp, mechanism to change the relative position of the cloth-holding clamp and stitch-forming mechanism, including a controller-cam capable of controlling the feed of the material transverse to its lengthwise feed, in combination with a cutter, a cutter-actuating mechanism, stopping mechanism, and actuating mechanism therefor including a tripping mechanism capable of adjustment to control the cutting of the buttonhole-slit either substantially at the commencement of the overseaming or substantially at the completion of the overseaming, substantially as described.

2. In a buttonhole-sewing machine, stitch-forming mechanism, a cloth-holding clamp, a cutter, cutter-actuating mechanism, and mechanism to change the relative position of the cloth-holding clamp and stitch-forming mechanism including a controller-cam, in combination with stopping mechanism and a tripping mechanism therefor adjustable for changing the initial action of the stitch-forming mechanism relatively to the cutter actuation, substantially as described.

3. In a buttonhole-sewing machine, stitch-forming mechanism, stopping mechanism, a cloth-holding clamp, mechanism for changing the relative position of said clamp and stitch-forming mechanism including a controller-cam, and means to rotate it, and means to trip the stopping mechanism interposed between the stopping mechanism and said cam and by the latter moved into position to trip the stopping mechanism, and adjustable with relation to the cam, substantially as described.

4. In a buttonhole-sewing machine, stopping mechanism, a stitch-forming mechanism and a feed mechanism therefor, including a rotating disk provided with an adjustably-secured tripping-pin for controlling the action of the stopping mechanism at one or the other of two predetermined positions in the finish end of the buttonhole, in combination, substantially as described.

5. In a buttonhole-sewing machine, stitch-forming mechanism, a cloth-clamp, and mechanism for changing the relative position of the cloth-clamp and stitch-forming mechanism for the automatic overseaming of the two sides and the barring of the two ends of the buttonhole, including a rotating cam-disk having barring-sections, one of which is provided with a radial portion of the same radius as that of the portion which controls the overseaming of one of the sides of the buttonhole-slit, in combination with a cutter, cutter-actuating mechanism, a stop mechanism, and a tripping mechanism for said stop mechanism capable of adjustment to compel the action of the cutter substantially at the commencement or completion of the cycle of feed movement, at the will of the operator, substantially as described.

6. In a buttonhole-sewing machine, stitch-forming mechanism and feeding mechanism for forming overseam-stitches, in combination with a rotary controller-cam and coacting jog-rollers, the periphery of said cam having cam portions arranged in different planes at right angles to the axis of revolution of the cam, said cam portions coöperating alternately with their respective jog-rollers, substantially as described.

7. In a buttonhole-sewing machine, stitch-forming mechanism and feeding mechanism for forming overseam-stitches, in combination with a rotary controller-cam and coacting jog-rollers, the periphery of said cam having cam portions arranged in different planes at right angles to the axis of revolution of the cam, said cam portions being of different contours and said contours in part concentric and in part eccentric relatively to the cam and coöperating alternately with their respective jog-rollers, substantially as described.

8. In a buttonhole-sewing machine, stitch-forming mechanism, and cloth-feeding mechanism including a controller-cam having in different horizontal planes opposite plain cam-surfaces of different radii, and intermediate stepped cam-surfaces, combined with jog-rollers one of which is arranged to contact with the plain and stepped cam-surfaces that are in one plane and the other to coöperate with the plain and stepped cam-surfaces in the other plane, substantially as described.

9. In a buttonhole-sewing machine, a stitch-forming mechanism, a cloth-holding clamp, a feed mechanism therefor including means for giving to the cloth-holding clamp its feed movements in opposite directions, lengthwise of the buttonhole, and a cam for controlling the feed of the material transverse to its lengthwise feed, in combination with independently-mounted jog-rollers, capable of adjustment relatively one to the other, said jog-rollers constructed to alternately coact with said cam, substantially as described.

10. In a buttonhole-sewing machine, a stitch-forming mechanism, a cloth-clamp, mechanism for giving to said clamp step-by-step feed movements in opposite directions lengthwise of the buttonhole, in combination with a controller-cam having peripheral cam-surfaces, and complemental jog-rollers coacting with said cam-surfaces, one of said jog-rollers being adjustable with relation to the cam-surfaces which coact with the other jog-roller, substantially as described.

11. In a buttonhole-sewing machine, a stitch-forming mechanism, a cloth-holding clamp and a controlling mechanism therefor including sectionally-constructed and vertically-divided cam portions, in combination with suitable jog-rollers vertically mounted, one of said rollers capable of adjustments relatively to the other, substantially as described.

12. In a buttonhole-sewing machine, a stitch-forming mechanism, a cloth-holding clamp, means for giving to said clamp transverse feed movements in opposite directions including a controller-cam and jog-rollers, the latter vertically mounted in independent bearings, one of said bearings capable of adjustment relatively to the other in combination, substantially as described.

In testimony whereof I have hereunto set my hand this 17th day of February, A. D. 1900.

FREELAND W. OSTROM.

Witnesses:
WM. H. FINCKEL,
E. A. FINCKEL.